United States Patent
Zahzam et al.

(10) Patent No.: US 10,178,752 B2
(45) Date of Patent: Jan. 8, 2019

(54) MEASUREMENT BY ATOMIC INTERFEROMETRY WITH MULTIPLE SPECIES OF ATOMS

(71) Applicant: ONERA (OFFICE NATIONAL D'ETUDES ET DE RECHERCHES AEROSPATIALES), Palaiseau (FR)

(72) Inventors: Nassim Zahzam, Palaiseau (FR); Yannick Bidel, Palaiseau (FR); Alexandre Bresson, Palaiseau (FR); Alexis Bonnin, Palaiseau (FR)

(73) Assignee: ONERA (OFFICE NATIONAL D'ETUDES ET DE RECHERCHES AEROSPATIALES), Palaiseau (FR)

( * ) Notice: Subject to any disclaimer, the term of this patent is extended or adjusted under 35 U.S.C. 154(b) by 0 days.

(21) Appl. No.: 15/549,697

(22) PCT Filed: Feb. 10, 2016

(86) PCT No.: PCT/FR2016/050301
§ 371 (c)(1),
(2) Date: Aug. 9, 2017

(87) PCT Pub. No.: WO2016/132047
PCT Pub. Date: Aug. 25, 2016

(65) Prior Publication Data
US 2018/0020534 A1    Jan. 18, 2018

(30) Foreign Application Priority Data

Feb. 16, 2015   (FR) ...................... 15 51267

(51) Int. Cl.
*H05H 3/02* (2006.01)
*G01V 7/00* (2006.01)
(Continued)

(52) U.S. Cl.
CPC ............... *H05H 3/02* (2013.01); *G01C 19/58* (2013.01); *G01J 9/02* (2013.01); *G01P 15/08* (2013.01); *G01P 15/093* (2013.01); *G01V 7/00* (2013.01)

(58) Field of Classification Search
CPC . G21K 1/00; G01J 9/02; G01P 15/093; G01V 7/00; H05H 3/02; G01B 9/02
See application file for complete search history.

(56) References Cited

U.S. PATENT DOCUMENTS 9,019,506 B1 *  4/2015  Black ................. G01B 9/02
                                           356/450
9,772,175 B2 *  9/2017  Black ................. G01B 9/02
(Continued)

OTHER PUBLICATIONS

Bonnin, A., et al. "Simultaneous dual-species matter-wave accelerometer." Physical Review A 88.4 (2013): 043615.*
(Continued)

*Primary Examiner* — Wyatt Stoffa
(74) *Attorney, Agent, or Firm* — Young & Thompson

(57) ABSTRACT

Disclosed is a method for measuring an external parameter by atomic interferometry, using two sets of atoms that belong to different species. Two measurements are taken simultaneously at the same location, but independently from one another, in order to obtain two measurement results. One of these measurement results removes an indeterminacy among several possible values of the external parameter, by taking into account only the other measurement result. A method of this kind can be used to measure a coordinate of a gravitational field or a coordinate of an acceleration of the atoms.

20 Claims, 3 Drawing Sheets

(51) Int. Cl.
   *G01C 19/58* (2006.01)
   *G01P 15/08* (2006.01)
   *G01J 9/02* (2006.01)
   *G01P 15/093* (2006.01)

(56) References Cited

U.S. PATENT DOCUMENTS

| 2013/0218504 | A1 | 8/2013 | Fall et al. | |
| 2015/0090028 | A1* | 4/2015 | Zahzam | G21K 1/006 73/382 R |
| 2017/0016710 | A1* | 1/2017 | Black | G01B 9/02 |
| 2017/0299389 | A1* | 10/2017 | Johnson | G01P 15/08 |
| 2017/0372808 | A1* | 12/2017 | Gill | G01P 15/08 |

OTHER PUBLICATIONS

A. Bonnin, et al., Simultaneous dual-species matter-wave accelerometer, Physical Review A, Oct. 11, 2013, pp. 043615-1-043615-5, vol. 88, No. 4, American Physical Society.

C.C.N. Kuhn, et al., A Bose-condensed, simultaneous dual species Mach-Zehnder atom interferometer, New Journal of Physics, Jul. 24, 2014, pp. 1-7, vol. 16, No. 7, Institute of Physics Publishing, Bristol, GB.

G.M. Tino, et al., Precision Gravity Tests with Atom Interferometry in Space, Nuclear Physics B: Proceedings Supplements, 2013, pp. 203-217, Elsevier B.V.

Mark Kasevich, et al., Atomic Interferometry Using Stimulated Raman Transitions, Physical Review Letters, Jul. 8, 1991, pp. 181-184, vol. 67, No. 2, The American Physical Society.

F. Sorrentino, et al., Simultaneous measurement of gravity acceleration and gravity gradient with an atom interferometer, Applied Physics Letters, 2012, pp. 114106-1-114106-4, vol. 101, American Institute of Physics.

Sheng-Wey Chiow, et al., 102hk Large Area Atom Interferometers, Physical Review Letters, Sep. 23, 2011, pp. 130403-1-130403-5, vol. 107, American Physical Society.

Q. Bodart, et al., A cold atom pyramidal gravimeter with a single laser beam, Applied Physics Letters, 2010, pp. 134101-1-134101-3, vol. 96, American Institute of Physics.

May 20, 2016, International Search Report issued for related International Application No. PCT/FR2016/050301.

* cited by examiner

MEASUREMENT BY ATOMIC INTERFEROMETRY WITH MULTIPLE SPECIES OF ATOMS

The present invention relates to a method of measurement by atomic interferometry, as well as apparatus for implementing this method.

Measurement of an inertial quantity by atomic interferometry is known. The inertial quantity can be a gravitational field coordinate or a coordinate of an acceleration that atoms used for the measurement are subjected to.

In order to carry out such a measurement, a set of atoms is cooled to a temperature of a few microkelvins, and then subjected to a sequence of interactions with photons in order to form atomic interference. A phase shift that appeared in the resulting matter-wave function for the set of atoms during formation of the atomic interference is then measured. In a known manner, when the set of atoms is subject to an acceleration during the formation of the interference, the phase shift is $\Delta\Phi = k \cdot a \times T^2 + \Delta\Phi_{op}$, where k is the wave vector that corresponds to the momentum received or transferred by one of the atoms during each interaction between the atoms and the photons, a is the vector of the acceleration that the atoms are subjected to, · denotes the scalar product operation between the vectors k and a, T is a base time that separates successive laser pulses in the sequence of interactions between the atoms and the photons that forms the interference, and $\Delta\Phi_{op}$ is a constant phase shift that depends on the manner of producing the interference conditions.

Actually, the measurement result, denoted P, is not the phase shift $\Delta\Phi$, directly, but a value that depends on this phase shift via a periodic function, according to the formula $P = P_0 \cdot [1 - C \times \cos(\Delta\Phi)]$, where $P_0$ and C are two non-zero numbers. Owing to the periodicity of the function $P(\Delta\Phi)$, several different values for the acceleration component a that is parallel to the wave vector k, are generally compatible with each measurement result P. This results in an indetermination as to which of these values correspond to the actual acceleration. More precisely, the values of the acceleration component a that corresponds to the same measurement result P are:

$$a_n = [\text{Arc } \cos(1/C - P/(C \times P_0)) - \Delta\Phi_{op} + n \times 2\Pi]/(k \times T^2)$$

and $$a_n^* = [-\text{Arc } \cos(1/C - P/(C \times P_0)) - \Delta\Phi_{op} + n \times 2\Pi]/(k \times T^2)$$

where k is the modulus of the wave vector k, n is any natural integer, and Arc cos denotes the inverse of the cosinus function. In practice, the value of the acceleration component a is expected to be within an interval, called an exploration interval, that is known beforehand, but the length of this interval is greater than $\Pi/(k \times T^2)$. The indetermination between several values $a_n$ and/or $a_n^*$ is therefore real.

In order to resolve—or eliminate—such an indetermination, it is known to join an inertial sensor to the apparatus for measurement by atomic interferometry, the measurement principle of which is different. This sensor provides a measurement result for the acceleration component a that is not very precise, but which is sufficient for eliminating the indetermination between the multiple values that are provided by the apparatus for measurement by atomic interferometry. Now these values obtained by atomic interferometry each have a high accuracy, so that the combination of the two apparatuses finally produces a result value that is single and accurate for the acceleration component.

But the addition of the inertial sensor that does not operate by atomic interferometry presents numerous drawbacks. Indeed, this inertial sensor is bulky, can be heavy, is capable of generating vibrations, and increases the cost price of the whole measurement device. In addition, the measurements that are carried out with the atomic interferometry apparatus and with the inertial sensor respectively cannot exactly relate to one and same location in space when they are carried out simultaneously, as the apparatus and the sensor are materially distinct, and therefore separated even if they are close to one another.

Moreover, producing atomic interferences with two sets of atoms of different species, at one and same location and at one and same time point, is known, in particular from the article entitled "Simultaneous Dual-Species Matter-Wave Accelerometer", by A. Bonnin, N. Zahzam, Y. Bidel and A. Bresson, Phys. Rev. A 88, 043615 (2013). Each set of atoms then provides a measurement result independently of the other set of atoms. The overall accuracy which results therefrom for each acceleration value thus determined by double-measurement is improved, but the indetermination between several possible values that has been shown above remains.

Finally, the article entitled "Simultaneous measurement of gravity acceleration and gravity gradient with an atom interferometer", by F. Sorrentino et al., Appl. Phys. Lett. 101, 114106 (2012), describes an atomic interference gradiometer. With the type of apparatus in this document, two measurements are performed simultaneously using two sets of atoms of one and same species, but located in two measurement locations that are remote from one another.

Starting from this situation, a purpose of the present invention consists in eliminating such an indetermination between several possible values for a parameter that is determined from measurements carried out by atomic interferometry, when these multiple values are all compatible with the measurement results.

An additional purpose of the invention is eliminating the indetermination without having to resort to a supplementary inertial sensor, in addition to the apparatus for measurement by atomic interferometry.

To achieve this, a first aspect of the invention proposes a method of measurement by atomic interferometry in which each session of measurements is executed with at least two sets of atoms, each of which is subjected to conditions of formation of an atomic interference. The atoms of each set of atoms are of a species that is dedicated to this set of atoms and is different from the species of atoms of each other set of atoms.

For each session of measurements, the conditions of formation of an atomic interference are produced for each set of atoms throughout a volume that is associated with this set of atoms and that contains at least one point in common with the volume associated with each other set of atoms. In other words, the atomic interferences are produced in one and same location for all the sets of atoms, so that the measurement results that are obtained for the different sets of atoms all relate to this same location.

Moreover, the conditions of formation of the atomic interference are produced for each set of atoms between a start time point and an end time point respectively before and after an intermediate time point that is common to all the sets of atoms. In other words, the atomic interferences are produced simultaneously for all the sets of atoms, so that the measurement results that are obtained for the different sets of atoms all relate to the intermediate time point.

A measurement result is then obtained in each session of measurements independently for each set of atoms, each measurement result varying according to a first function of a phase shift that appeared for the set of atoms during the formation of the atomic interference, and this phase shift itself being a second function of an external parameter a value of which is sought. Under these conditions, the first function is alternately increasing and decreasing for at least a first of the sets of atoms so that one and same measurement result that is obtained for this first set of atoms corresponds to several possible values of the external parameter within a non-zero exploration interval. Simultaneously, the second function has, for at least one other of the sets of atoms different from the first set of atoms, a derivative with respect to the value of the external parameter, that depends on at least one factor selected from a base time for a sequence of interactions between the atoms and photons, and a number of photons involved in a multiphoton interaction, the sequence of interactions or the multiphoton interaction being implemented in order to form the atomic interference of the other set of atoms.

According to the invention, a value of the factor is selected in order to carry out a session of measurements, so that the measurement result that is obtained for the other set of atoms corresponds to a single value of the external parameter within the exploration interval, so that an indetermination between several values of the external parameter that exists from the measurement result obtained for the first set of atoms, is eliminated by correlation with the measurement result obtained for the other set of atoms.

Thus, the invention eliminates the indetermination of the prior measurement apparatus, without requiring an inertial sensor other than the multiple atomic interferometry system.

The first function may have the expression $P=P_0 \cdot [1-C \times \cos(\Delta\Phi(a))]$ at least for the first set of atoms, where P denotes the measurement result, a denotes the external parameter the value of which is sought, $\Delta\Phi(a)$ is the phase shift and $P_0$ and C are two non-zero numbers.

The second function may be of the affine function type, at least for the so-called other set of atoms. In this case, a slope coefficient of this affine function may be equal to $k \times T^2$, where T is the base time for the corresponding sequence of interactions between the atoms and the photons, and k is a modulus of a momentum received or transferred by one of the atoms during each interaction between the atoms and the photons, divided by $h/(2\Pi)$, where h is Planck's constant.

Moreover, a derivative of the measurement result that is obtained during a session of measurements for the first set of atoms, with respect to the value of the external parameter, may be greater than the derivative of the measurement result that is obtained during the same session of measurements for the other set of atoms, also with respect to the value of the external parameter, in absolute values. Thus, the first set of atoms provides a better accuracy in the value that is determined unequivocally thanks to the other set of atoms, for the external parameter at the end of the session of measurements.

In various embodiments of the invention, two of the species of atoms, which are dedicated to different sets of atoms used in one and same session of measurements, may be the rubidium isotopes 85 and 87. Alternatively, they can be respective isotopes of rubidium and caesium, or of rubidium and potassium.

In general, the external parameter may be a coordinate of a gravitational field, or a coordinate of an acceleration that the atoms are subjected to.

A second aspect of the invention proposes an apparatus for measurement by atomic interferometry that comprises:
a source of atoms suitable for producing at least two sets of atoms, with the atoms of each set of atoms that are of a species dedicated to this set of atoms and different from the species of atoms of each other set of atoms;
means suitable for producing conditions of atomic interference for each set of atoms, in such a way that these conditions are produced for each set of atoms throughout a volume that is associated with the set of atoms and that contains at least one point in common with the volume associated with each other set of atoms, and are produced between a start time point and an end time point respectively before and after an intermediate time point that is common to all the sets of atoms, so as to constitute a session of measurements;
a detection device, which is arranged to provide measurement results respectively and independently for all the sets of atoms of each session of measurements; and
an analysis unit, which is suitable for calculating at least one value of an external parameter from each measurement result.

According to the invention, the apparatus is suitable for implementing a method that complies with the first aspect of the invention as described above, including its variants and its improvements.

Advantageously, for each session of measurements, the conditions of atomic interferences can be produced for all the sets of atoms using a single laser assembly, which is common to these sets of atoms.

Such an apparatus may in particular form an accelerometer, a gravimeter or a gyrometer.

Other particular features and advantages of the present invention will become apparent from the following description of non-limitative embodiment examples, with reference to the attached drawings, in which.

For sake of clarity, the dimensions of the elements that are shown in these figures do not correspond to real dimensions or to proportions of real dimensions. Moreover, identical references that are indicated in different figures denote elements that are identical or that have identical functions.

Figure 1:
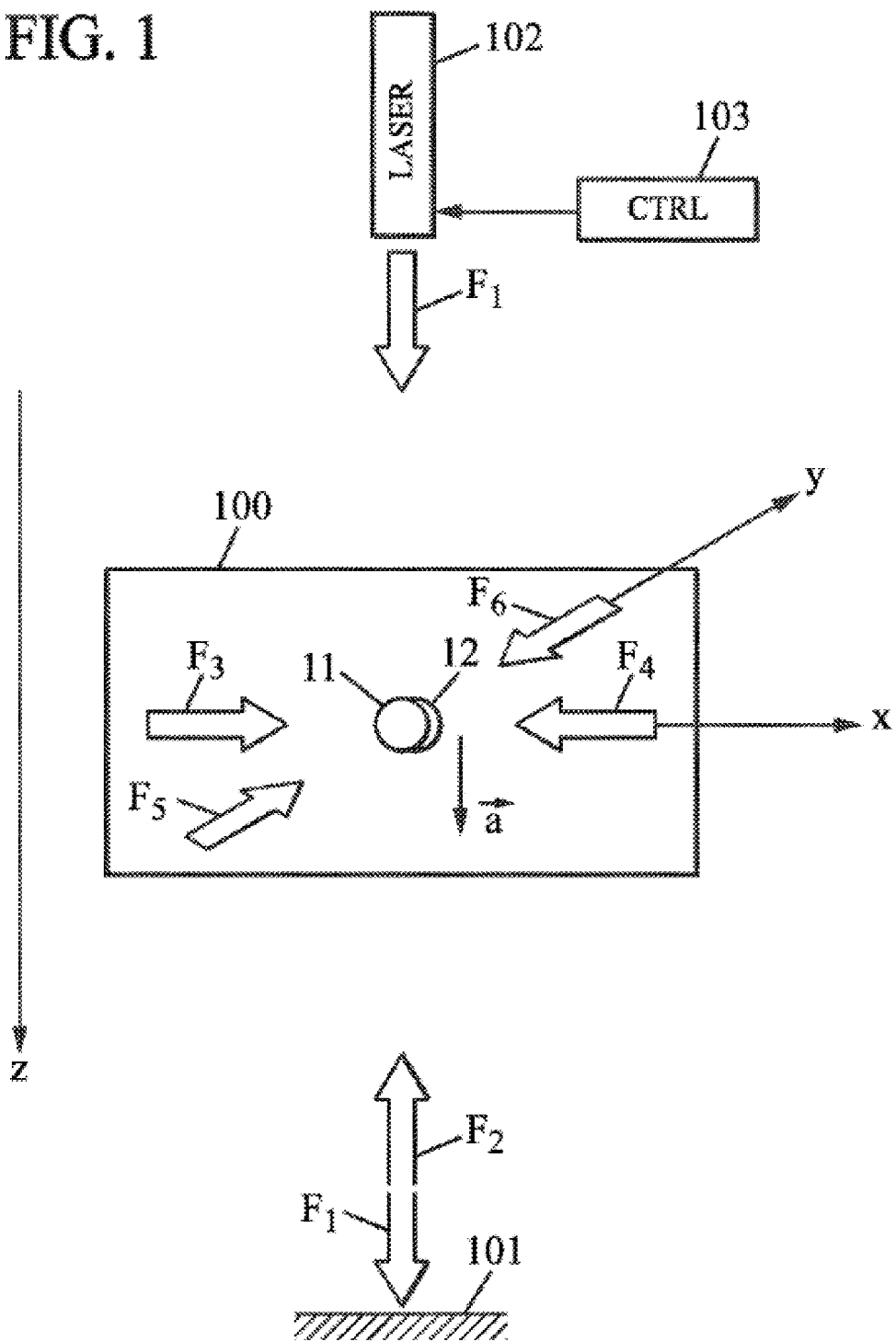
FIG. 1 is a general diagram of an apparatus for measurement by atomic interferometry according to the present invention.
Figure 2:
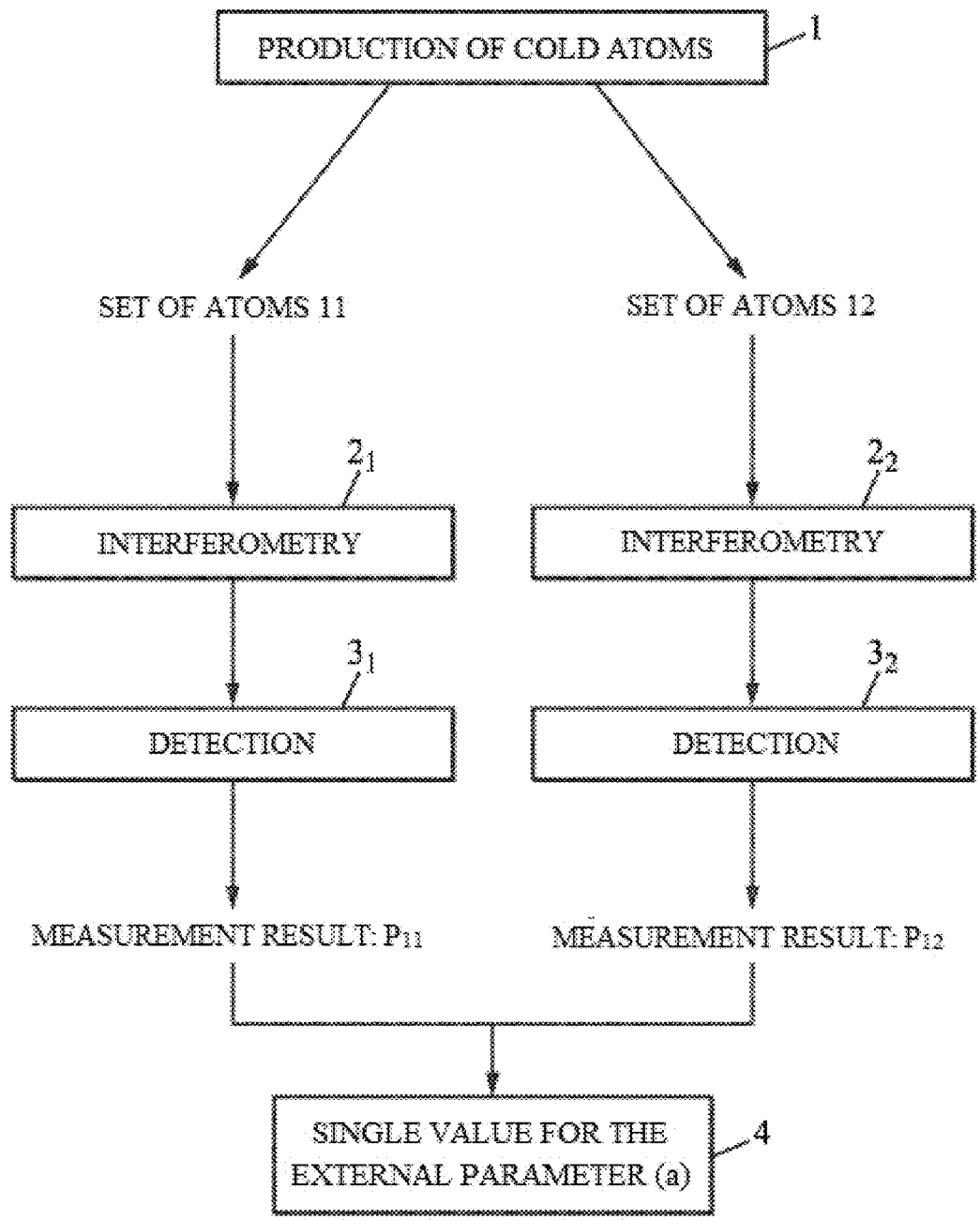
FIG. 2 shows steps of a session of measurements carried out using the apparatus according to FIG. 1.

As shown in FIGS. 1 and 2, an apparatus according to the invention comprises a source of atoms 100 that is used for producing two sets of cold atoms 11 and 12, corresponding to step 1 in FIG. 2. Preferably, the atoms of set 11 can be $^{85}$Rb atoms, and those of set 12 can be $^{87}$Rb atoms. The source 100 has the function of trapping the atoms of each set 11, 12 and cooling them to a specified temperature. It can have one of the structures known to a person skilled in the art, such as a magneto-optical trap. Such a trap comprises a pair of coils (not shown) in anti-Helmholtz configuration, which are supplied with electric current during a first phase of operation of the trap in order to create a magnetic field gradient at the location in which each set of atoms is held. Three pairs of laser beams cross at this location, propagating in opposite directions for two beams of one and the same pair. Thus, beams $F_1$ and $F_2$ propagate in opposite directions along the z axis, beams $F_3$ and $F_4$ along the x axis and beams $F_5$ and $F_6$ along the y axis. Different methods of forming beams $F_1$-$F_6$, in particular using reflecting mirrors such as mirror 101 in order to reduce the number of laser sources that are required, are so well known that it is not necessary to repeat them. In a second phase of operation of the magneto-optical trap, the magnetic field gradient is suppressed and the radiation frequencies of the laser beams are detuned in order to obtain the sets of cold atoms 11 and 12, called molasses.

Actually, the source 100 may comprise two injectors of atoms, of $^{85}$Rb and of $^{87}$Rb respectively, and the magneto-optical trap is controlled in order to produce two entangled trapping structures, that are intended for the $^{85}$Rb atoms and the $^{87}$Rb atoms respectively. The source 100 is adjusted so that the two sets 11 and 12 are available at the same time and in the same location, for each to be subjected to a sequence of interactions with photons independently of the other set of atoms.

The sequences of interactions with the photons are then produced simultaneously for the two sets of atoms 11 and 12, corresponding to steps $2_1$ and $2_2$, in order to produce atomic interference for each of these sets independently of the other set. Each sequence may comprise a series of laser pulses in order to cause stimulated transitions between two states of the atoms of set 11 or 12 to which the sequence is dedicated. Several sequences of pulses can be used alternately, including that which is usually called "Mach-Zehnder" and is described in the article entitled "Atomic interferometry using stimulated Raman transitions", by M. Kasevich et al., Phys. Rev. Lett. 67, pp. 181-184 (1991) and which is repeated now:

a first pulse, called π/2 pulse and having a splitting function for the wave function of the initial set of atoms, in order to produce two atomic wave packets;
a second pulse, called π and having an atomic mirror function for each atomic wave packet; and then
a third pulse, again π/2 and having a function of recombination of the atomic wave packets.

Figure 3:
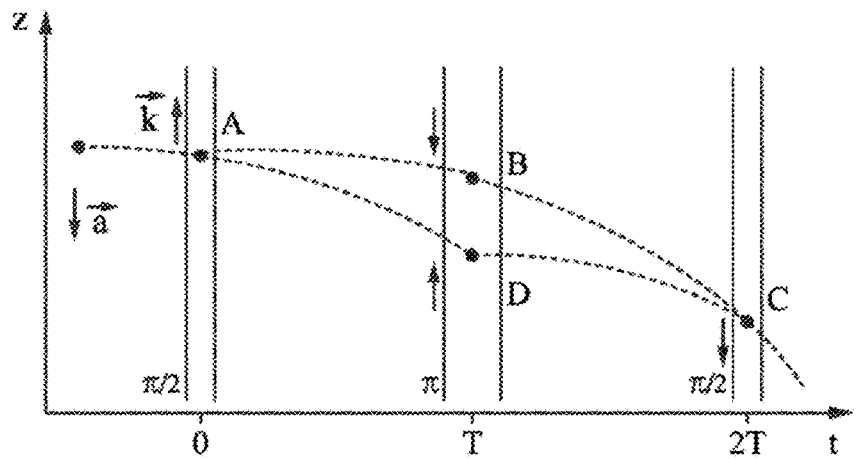
FIG. 3 shows a particular sequence of interactions for creating atomic interference, which can be used for implementing the invention.

This sequence of interactions is shown in FIG. 3, in which t denotes time, and A, B, C and D denote the interactions that a part of the set of atoms in question is subjected to each time. k denotes the moduli of the wave vectors $k_{11}$ and $k_{12}$ alternately, which will be defined below for the sets of atoms 11 or 12 respectively, and similarly for T, which denotes the base times $T_{11}$ and $T_{12}$ alternately.

In particular, the apparatus configuration that is described in the article "A cold atom pyramidal gravimeter with a single laser beam", by Q. Bodart et al., Appl. Phys. Lett. 96, 134101 (2010), may be adopted. The magneto-optical trap and the means for producing the conditions of atomic interference are produced using a single laser source assembly, comprising the laser source 102 and the control unit 103. Such an apparatus configuration is simple, economical and very compact. Moreover, the same laser source assembly can be used for both sets of atoms 11 and 12, as described in the article entitled "Simultaneous Dual-Species Matter-Wave Accelerometer", by A. Bonnin, N. Zahzam, Y. Bidel and A. Bresson, Phys. Rev. A 88, 043615 (2013), so that it has the following four functions:

trapping and cooling the atoms of set 11;
trapping and cooling the atoms of set 12;
producing the pulses for creating the atomic wave interferences for the set of atoms 11; and
producing the pulses for creating the atomic wave interferences for the set of atoms 12.

Each interferometry measurement then proceeds by detection of the proportion of the atoms of the corresponding set that are in a specified state, for example one of two fundamental hyperfine states. Several different techniques are known to a person skilled in the art for carrying out such a detection. For example, it may be a measurement of light absorption, with pulses of radiation the wavelength of which is selected in order to cause absorption from just one of the hyperfine atomic states. Such detections are carried out independently for the two sets of atoms 11 and 12, according to steps $3_1$ and $3_2$ in FIG. 2. Suitable detection devices are also assumed to be known, and are not shown in FIG. 1 for the sake of clarity.

A first measurement result, denoted $P_{11}$, is thus obtained for the set of atoms 11, and a second measurement result, denoted $P_{12}$, is also obtained for the set of atoms 12. The set of steps formed by the production of the two sets of atoms 11 and 12 (step 1), the production of the simultaneous sequences of interactions with photons, for the two sets of atoms respectively (steps $2_1$ and $2_2$), and the two detections of the proportions of atoms that are finally in a specified state for obtaining the measurement results $P_{11}$ and $P_{12}$ (steps $3_1$ and $3_2$), constitute a session of measurements. Such a session is characterized by the simultaneity of the sequences of interactions that produce the atomic interferences, and the co-localization of the sets of atoms during these sequences, whereas the atoms of the two sets are of different species.

Under these conditions, the measurement result $P_{11}$ is linked to component a along the z axis of the acceleration a that the atoms of set 11 undergo, by the following two relationships:

$$P_{11} = P_0 \cdot [1 - C \times \cos(\Delta\Phi_{11}(a))]$$

and $\Delta\Phi_{11}(a) = k_{11} \times T_{11}^2 \times a + \Delta\Phi_{op}$ where $P_0$ and C are two known non-zero numbers,
$\Delta\Phi_{11}(a)$ is the phase shift undergone by the atoms of set 11 during formation of the atomic interference that is intended for them,
$k_{11}$ is the modulus of the wave vector that corresponds to a momentum received or transferred by one of the atoms of the set 11 during each interaction between these atoms and the photons,
$T_{11}$ is the base time that separates the successive laser pulses in the sequence of interactions between the atoms of the set 11 and the photons, and
$\Delta\Phi_{op}$ is a constant phase shift that depends on the manner of producing the interference conditions for the set of atoms 11.

In the same way, for the atoms of set 12, the measurement result $P_{12}$ is linked to the same value of component a along the z axis of the acceleration a by the following two other relationships:

$$P_{12} = P_0' \cdot [1 - C' \times \cos(\Delta\Phi_{12}(a))]$$

and $\Delta\Phi_{12}(a) = k_{12} \times T_{12}^2 \times a + \Delta\Phi_{op}'$ where $P_0'$ and C' are two known non-zero numbers, which may or may not be different from $P_0$ and C
$\Delta\Phi_{12}(a)$ is the phase shift undergone by the atoms of the set 12 during formation of the atomic interference that is intended for them,
$k_{12}$ is the modulus of the wave vector that corresponds to a momentum received or transferred by one of the atoms of the set 12 during each interaction between these atoms and the photons,
$T_{12}$ is the base time which separates the successive laser pulses in the sequence of interactions between the atoms of the set 12 and the photons, and
$\Delta\Phi_{op}'$ is a constant phase shift that depends on the manner of producing the interference conditions for the set of atoms 12, being able to be different from $\Delta\Phi_{op}$.

In connection with the terms that have been used in the general part of the present description:

the set of atoms 11 has been called first set of atoms, $P_{11}$ as a function of $\Delta\Phi_{11}$, has been called first function, effective for the first set of atoms, $\Delta\Phi_{11}$ as a function of a, has been called second function, effective for the first set of atoms, $k_{11} \times T_{11}^2$ is the slope coefficient of the function $\Delta\Phi_{11}(a)$ which is of the affine function type the set of atoms 12 has been called other set of atoms, $P_{12}$ as a function of $\Delta\Phi_{12}$, has also been called first function, but effective for the other set of atoms, $\Delta\Phi_{12}$ as a function of a, has also been called second function, but effective for the other set of atoms, $k_{12} \times T_{12}^2$ is the slope coefficient of the function $\Delta\Phi_{12}(a)$ which is also of the affine function type, and a is the external parameter the value of which is sought.

The external parameter a that is measured may be a component of an acceleration, for example due to a translational or rotational movement of a device carrying the apparatus for measurement by atomic interferometry, or may be a component of a gravitational field in which the apparatus is located.

According to the invention, the conditions of formation of the atomic interference for the set of atoms 12 are selected so that the derivative of the phase shift $\Delta\Phi_{12}$ with respect to the external parameter a eliminates the indetermination that is caused by the periodicity of the measurement result $P_{11}$ considered as a function of the same external parameter a. Practically, starting from the formulae that have been mentioned above, these conditions of formation are selected so that $k_{12} \times T_{12}^2$ has a value that is sufficiently different from that of $k_{11} \times T_{11}^2$. This can be obtained by varying the value of $T_{12}$ with respect to that of $T_{11}$, or by varying the value of $k_{12}$ with respect to that of $k_{11}$. Optionally, these two methods can be combined. In other words, the following three alternatives are possible for implementing the invention:

$$T_{12} \neq T_{11} \text{ and } k_{12} = k_{11}$$

$$T_{12} = T_{11} \text{ and } k_{12} \neq k_{11}$$

$$T_{12} \neq T_{11} \text{ and } k_{12} \neq k_{11} \text{ so that } k_{12} \times T_{12}^2 \neq k_{11} \times T_{11}^2$$

Figure 4:
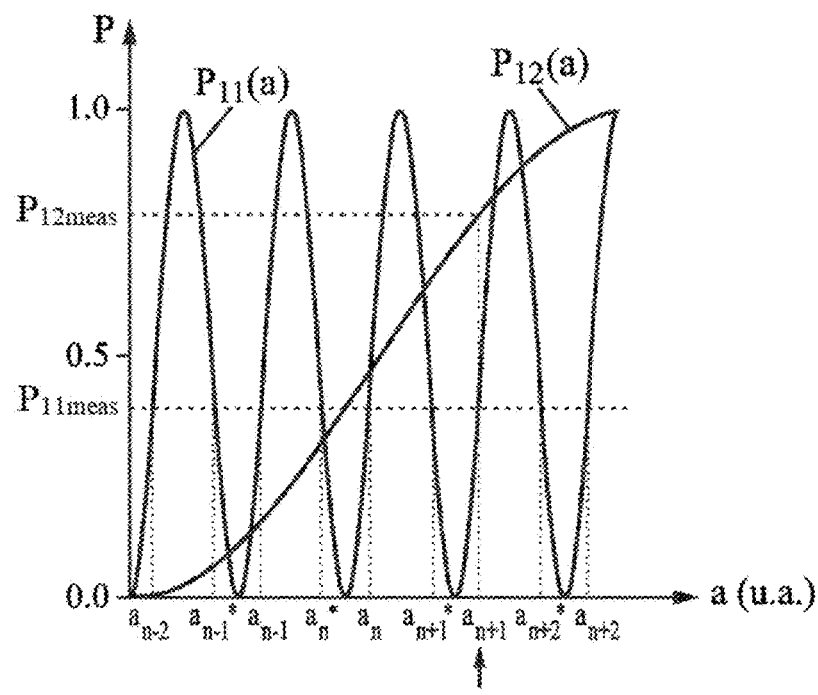
FIG. 4 shows a removal of indetermination obtained by applying the invention.

FIG. 4 shows an example of implementation of the invention, in which the values of the base time $T_{11}$, $T_{12}$ and of the moduli of wave vectors $k_{11}$ and $k_{12}$ are selected such that $k_{12} \times T_{12}^2 = (1/9) \times k_{11} \times T_{11}^2$. Thus, the function $P_{12}(a)$ has a period that is nine times larger than that of the function $P_{11}(a)$. For the purposes of illustration of FIG. 4, the following values were adopted for the constant numbers: $P_0 = P_0' = 0.5$ and $C = C' = 1.0$. In the diagram of FIG. 4, the horizontal axis gives the values of the external parameter a in arbitrary units, and the vertical axis, generically denoted P, gives the values of the measurement results $P_{11}$ and $P_{12}$. The two curves denoted $P_{11}(a)$ and $P_{12}(a)$ correspond to the formulae that were given above. If the interval in which the value of a is sought, called exploration interval and originating for example from prior knowledge, is smaller than the quarter of the period of the function $P_{12}(a)$, then the measurement result $P_{12}$ makes it possible to eliminate the indetermination that affects the calculation of a starting from the single result $P_{11}$. For example, the values which have been obtained for the two measurement results $P_{11}$ and $P_{12}$ from one and same session of measurements are those denoted $P_{11meas}$ and $P_{12meas}$. The value of the external parameter a that is deduced from this session of measurements is therefore the single abscissa value in the diagram of FIG. 4, that solves the two equations $P_{11}(a) = P_{11meas}$ and $P_{12}(a) = P_{12meas}$ simultaneously. This value is shown by an arrow in the diagram, from all the values of a that satisfy individually the equation $P_{11}(a) = P_{11meas}$. All these values are denoted $a_{n-2}$, $a_{n-1}^*$, $a_{n-1}$, $a_n^*$ ... according to the formulae concerned that have been given in the general part of the present description.

The accuracy in the determination of the value of the external parameter a is greater for the measurement that is carried out with the set of atoms 11, with respect to the accuracy that is provided by the measurement carried out with the set of atoms 12. In the diagram of FIG. 4, this results from the fact that outside the restricted zones around the maxima and the minima of the curve of the function $P_{11}(a)$, this curve $P_{11}(a)$ has a slope that is greater than that of the other curve $P_{12}(a)$, in absolute values.

In practice, it is possible that the reports of the two values of results $P_{11meas}$ and $P_{12meas}$ which have been obtained for one and the same session of measurements do not exactly correspond to a single common value for the external parameter a. In this case, the value to be selected for the external parameter a is that from all the values that satisfy $P_{11}(a) = P_{11meas}$, that is the closest to the single value of a that satisfies $P_{12}(a) = P_{12meas}$. In other words, the measurement that is carried out with the set of atoms 12 has the function of eliminating the indetermination that results from the measurement carried out with the set of atoms 11, but this last measurement, carried out from the set of atoms 11, provides the better accuracy for the value of a that is finally determined.

Analysis of the measurement results $P_{11}$ and $P_{12}$ that has just been described for arriving at the single value of the external parameter a (step 4 in FIG. 2), can be executed by an analysis unit (not shown) using a dedicated program.

For example, the base time $T_{11}$ may be equal to 150 ms (millisecond), and the base time $T_{12}$ may be equal to 50 ms. In this case, the moduli of the wave vectors $k_{11}$ and $k_{12}$ may be equal.

Moreover, several methods are known for adjusting the moduli of the wave vectors $k_{11}$ and $k_{12}$ to different values. The majority of these methods utilize two laser beams $F_1$ and $F_2$ which propagate in opposite directions in parallel with a common direction (see FIG. 1). Each interaction between the radiation of two laser beams and an atom of one of the sets 11/12 is of the multiphoton type, and the modulus of the wave vector $k_{11/12}$ that is involved in the formulae mentioned above corresponds to the total momentum $p_{tot}$ that is transferred to the atom during such multiphoton interaction: $k_{11/12} = 2\Pi p_{tot}/h = N_{11/12} \times k_{laser} = N_{11/12} \times 2\Pi/\lambda_{laser}$, where h is Planck's constant, $k_{laser}$ and $\lambda_{laser}$ are respectively the modulus of the wave vector and the wavelength of the laser radiation constituting beams $F_1$ and $F_2$ ($k_{laser} = 2\Pi/\lambda_{laser}$), and $N_{11}$ and $N_{12}$ denote the numbers of photons that are involved in each multiphoton interaction, for an atom of set 11 or for an atom of set 12, respectively. The two numbers $N_{11}$ and $N_{12}$ can be selected independently of one another, from the conditions of formation of atomic interference for the concerned set of atoms. Thus, these conditions determine the types of multiphoton interactions that are generated and the number $N_{11/12}$ of photons that are involved in each interaction. For example, each multiphoton interaction may be a diffraction of the atoms by optical gratings that are formed with beams $F_1$ and $F_2$, in Bragg mode or in Bloch oscillation mode with atomic transitions without internal change of state for the atoms. The article entitled "102 hk Large Area Atom Interferometers" by S-w. Chiow, T. Kovachy, H-C. Chien and M. A. Kasevich, Phys. Rev. Lett.

107, 130403 (2011), describes implementing multiphoton Bragg interactions by producing each pulse of radiation of the sequence that forms the atomic interference, in the form of a series of base subpulses. Alternatively, each multiphoton interaction may be a Raman transition, or a double diffraction caused by an optical grating, i.e. atomic transitions that are accompanied by changes of the internal state of the atom.

It is understood that the invention can be modified or adapted relative to the detailed description that has just been given. In particular, the pulse sequence that forms each atomic interference is not necessarily of the Mach-Zehnder type, but can be replaced with one of the other sequences known to a person skilled in the art for forming atomic interference.

Finally, the type of each interaction between atoms and photons that is caused in each sequence can be varied, provided that the combination of the interactions of the sequence once again forms an atomic interference, and that the wave vectors associated with the total momenta that are transferred to the atoms during these interactions satisfy the present invention.

The invention claimed is:

1. A method of measurement by atomic interferometry, in which each session of measurements is executed with at least two sets of atoms each subjected to conditions of formation of an atomic interference, the atoms of each set of atoms being of a species dedicated to said set of atoms and different from the species of atoms of each other set of atoms, method in which, for each session of measurements, said conditions are produced for each set of atoms throughout a volume that is associated with said set of atoms and that contains at least one point in common with the volume associated with each other set of atoms, and are produced between a start time point and an end time point respectively before and after an intermediate time point that is common to all the sets of atoms, and in which a measurement result is obtained in each session of measurements independently for each set of atoms, each measurement result varying according to a first function of a phase shift that appeared for the set of atoms during the formation of the atomic interference, and said phase shift itself being a second function of an external parameter a value of which is sought, said first function being alternately increasing and decreasing for at least a first of the sets of atoms so that a measurement result that is obtained for said first set of atoms corresponds to several possible values of the external parameter within a non-zero exploration interval, and said second function having, for at least one other of the sets of atoms different from said first set of atoms, a derivative with respect to the value of the external parameter, that depends on at least one factor selected from a base time for a sequence of interactions between the atoms and photons, and a number of photons involved in a multiphoton interaction, said sequence of interactions or said multiphoton interaction being implemented in order to form the atomic interference of said other set of atoms, wherein a value of the factor is selected in order to carry out a session of measurements, so that the measurement result that is obtained for said other set of atoms corresponds to a single value of the external parameter within the exploration interval, so that an indetermination between several values of the external parameter that exists from the measurement result obtained for the first set of atoms, is eliminated by correlation with the measurement result obtained for said other set of atoms.

2. The method according to claim 1, wherein the first function has the expression $P=P_0 \cdot [1-C \times \cos(\Delta\Phi(a))]$ at least for the first set of atoms, where P denotes the measurement result, a denotes the external parameter, $\Delta\Phi(a)$ is the phase shift and $P_0$ and C are two non-zero numbers.

3. The method according to claim 2, wherein the second function is of affine function type at least for said other set of atoms.

4. The method according to claim 2, wherein a derivative of the measurement result obtained during a session of measurements for the first set of atoms, with respect to the value of the external parameter, is greater than the derivative of the measurement result obtained during the same session of measurements for said other set of atoms, also with respect to the value of the external parameter, in absolute values.

5. The method according to claim 2, wherein two of the species of atoms, which are dedicated respectively to two of the sets of atoms used in one and same session of measurements, are the rubidium isotopes 85 and 87, or respective isotopes of rubidium and caesium, or respective isotopes of rubidium and potassium.

6. The method according to claim 2, wherein the external parameter is a gravitational field coordinate or a coordinate of an acceleration that atoms are subjected to.

7. The method according to claim 1, wherein the second function is of affine function type at least for said other set of atoms.

8. The method according to claim 7, wherein a derivative of the measurement result obtained during a session of measurements for the first set of atoms, with respect to the value of the external parameter, is greater than the derivative of the measurement result obtained during the same session of measurements for said other set of atoms, also with respect to the value of the external parameter, in absolute values.

9. The method according to claim 7, wherein two of the species of atoms, which are dedicated respectively to two of the sets of atoms used in one and same session of measurements, are the rubidium isotopes 85 and 87, or respective isotopes of rubidium and caesium, or respective isotopes of rubidium and potassium.

10. The method according to claim 7, wherein a slope coefficient of the affine function is equal to $k \times T^2$, where T is the base time for the sequence of interactions between the atoms and the photons, and k is a modulus of a momentum received or transferred by one of the atoms during each interaction between the atoms and the photons, divided by $h/(2\Pi)$, where h is Planck's constant.

11. The method according to claim 10, wherein a derivative of the measurement result obtained during a session of measurements for the first set of atoms, with respect to the value of the external parameter, is greater than the derivative of the measurement result obtained during the same session of measurements for said other set of atoms, also with respect to the value of the external parameter, in absolute values.

12. The method according to claim 10, wherein two of the species of atoms, which are dedicated respectively to two of the sets of atoms used in one and same session of measurements, are the rubidium isotopes 85 and 87, or respective isotopes of rubidium and caesium, or respective isotopes of rubidium and potassium.

13. The method according to claim 1, wherein a derivative of the measurement result obtained during a session of measurements for the first set of atoms, with respect to the value of the external parameter, is greater than the derivative of the measurement result obtained during the same session of measurements for said other set of atoms, also with respect to the value of the external parameter, in absolute values.

14. The method according to claim 13, wherein two of the species of atoms, which are dedicated respectively to two of the sets of atoms used in one and same session of measurements, are the rubidium isotopes 85 and 87, or respective isotopes of rubidium and caesium, or respective isotopes of rubidium and potassium.

15. The method according to claim 1, wherein two of the species of atoms, which are dedicated respectively to two of the sets of atoms used in one and same session of measurements, are the rubidium isotopes 85 and 87, or respective isotopes of rubidium and caesium, or respective isotopes of rubidium and potassium.

16. The method according to claim 1, wherein the external parameter is a gravitational field coordinate or a coordinate of an acceleration that atoms are subjected to.

17. An apparatus for measurement by atomic interferometry comprising:
   a source of atoms suitable for producing at least two sets of atoms, with the atoms of each set of atoms that are of a species dedicated to said set of atoms and different from the species of atoms of each other set of atoms;
   means suitable for producing conditions of atomic interference for each set of atoms, in such a way that said conditions are produced for each set of atoms throughout a volume that is associated with said set of atoms and that contains at least one point in common with the volume associated with each other set of atoms, and are produced between a start time point and an end time point respectively before and after an intermediate time point that is common to all the sets of atoms, so as to constitute a session of measurements;
   a detection device, which is arranged to provide measurement results respectively and independently for all the sets of atoms of each session of measurements; and
   an analysis unit, which is suitable for calculating at least one value of an external parameter from each measurement result,
in which each measurement result varies according to a first function of a phase shift that appeared for the corresponding set of atoms during formation of the atomic interference, and said phase shift is itself a second function of the external parameter,
said first function being alternately increasing and decreasing for at least a first of the sets of atoms so that one and same measurement result that is obtained for said first set of atoms corresponds to several possible values of the external parameter within a non-zero exploration interval, and
said second function having, at least for one other of the sets of atoms different from said first set of atoms, a derivative with respect to the value of the external parameter, that depends on at least one factor selected from a base time for a sequence of interactions between the atoms and photons, and a number of photons involved in a multiphoton interaction, said sequence of interactions or said multiphoton interaction being implemented in order to form the atomic interference of said other set of atoms,
wherein at least one of the base time that is effective for the sequence of interactions between the atoms and photons, and the number of photons that are involved in the multiphoton interaction, for the first set of atoms or for said other set of atoms, is such that, for one and same session of measurements, the measurement result that is obtained for said other set of atoms corresponds to a single value of the external parameter within the exploration interval.

18. The apparatus according to claim 17, in which for each session of measurements, the conditions of atomic interferences are produced for all the sets of atoms using a single laser source assembly, that is common to said sets of atoms.

19. The apparatus according to claim 17, forming an accelerometer, a gravimeter or a gyrometer.

20. A method of measurement by atomic interferometry, in which each session of measurements is executed with at least two sets of atoms each subjected to conditions of formation of an atomic interference, comprising:
   providing an apparatus for measurement by atomic interferometry comprising:
      a source of atoms suitable for producing at least two sets of atoms, with the atoms of each set of atoms that are of a species dedicated to said set of atoms and different from the species of atoms of each other set of atoms;
      means suitable for producing conditions of atomic interference for each set of atoms, in such a way that said conditions are produced for each set of atoms throughout a volume that is associated with said set of atoms and that contains at least one point in common with the volume associated with each other set of atoms, and are produced between a start time point and an end time point respectively before and after an intermediate time point that is common to all the sets of atoms, so as to constitute a session of measurements;
      a detection device, which is arranged to provide measurement results respectively and independently for all the sets of atoms of each session of measurements; and
      an analysis unit, which is suitable for calculating at least one value of an external parameter from each measurement result,
   in which each measurement result varies according to a first function of a phase shift that appeared for the corresponding set of atoms during formation of the atomic interference, and said phase shift is itself a second function of the external parameter,
   said first function being alternately increasing and decreasing for at least a first of the sets of atoms so that one and same measurement result that is obtained for said first set of atoms corresponds to several possible values of the external parameter within a non-zero exploration interval, and
   said second function having, at least for one other of the sets of atoms different from said first set of atoms, a derivative with respect to the value of the external parameter, that depends on at least one factor selected from a base time for a sequence of interactions between the atoms and photons, and a number of photons involved in a multiphoton interaction, said sequence of interactions or said multiphoton interaction being implemented in order to form the atomic interference of said other set of atoms,
   using the apparatus to perform a session of measurements, wherein
   a measurement result is obtained in the session of measurements independently for each set of atoms, and wherein a value of the factor is selected in order to carry out the session of measurements, so that the measurement result that is obtained for said other set of atoms corresponds to a single value of the external parameter within the exploration interval, so that an indetermination between several values of the external parameter that exists from the measurement result obtained for the first set of atoms, is eliminated by correlation with the measurement result obtained for said other set of atoms.

* * * * *